(12) United States Patent
Rubinsztajn et al.

(10) Patent No.: US 7,279,223 B2
(45) Date of Patent: *Oct. 9, 2007

(54) UNDERFILL COMPOSITION AND PACKAGED SOLID STATE DEVICE

(75) Inventors: Slawomir Rubinsztajn, Niskayuna, NY (US); John Robert Campbell, Clifton Park, NY (US); Ananth Prabhakumar, Schenectady, NY (US); Sandeep Tonapi, Niskayuna, NY (US)

(73) Assignee: General Electric Company, Schnectady, NY (US)

( * ) Notice: Subject to any disclaimer, the term of this patent is extended or adjusted under 35 U.S.C. 154(b) by 341 days.

This patent is subject to a terminal disclaimer.

(21) Appl. No.: 10/737,453

(22) Filed: Dec. 16, 2003

(65) Prior Publication Data

US 2005/0129956 A1 Jun. 16, 2005

(51) Int. Cl.
- *B32B 27/38* (2006.01)
- *B32B 27/18* (2006.01)
- *C08L 63/00* (2006.01)
- *C08L 83/00* (2006.01)
- *H01L 21/56* (2006.01)

(52) U.S. Cl. .......................... 428/414; 428/413; 438/108; 438/127; 523/440; 523/443; 523/466; 525/476; 525/533

(58) Field of Classification Search ................ 428/413, 428/414, 416, 418, 108, 127; 523/440, 443; 523/466; 525/476, 523, 533
See application file for complete search history.

(56) References Cited

U.S. PATENT DOCUMENTS

| | | | |
|---|---|---|---|
| 4,381,396 A | 4/1983 | Ryang | |
| 4,511,701 A | 4/1985 | Ryang | |
| 5,350,811 A | 9/1994 | Ichimura et al. | |
| 5,648,407 A | 7/1997 | Goetz et al. | |
| 5,700,581 A * | 12/1997 | Sachdev et al. | 428/447 |
| 6,180,696 B1 | 1/2001 | Wong et al. | |
| 6,528,169 B2 | 3/2003 | Charles et al. | |
| 6,664,318 B1 * | 12/2003 | Bymark et al. | 524/261 |
| 6,673,458 B2 * | 1/2004 | Mager et al. | 428/450 |
| 6,706,417 B2 | 3/2004 | Konarski et al. | |
| 7,022,410 B2 * | 4/2006 | Tonapi et al. | 428/414 |
| 2003/0218258 A1 | 11/2003 | Charles et al. | |
| 2004/0102529 A1 * | 5/2004 | Campbell et al. | 516/79 |

FOREIGN PATENT DOCUMENTS

| | | |
|---|---|---|
| EP | 1 236 765 | 2/2001 |
| JP | 60069131 | 4/1985 |
| JP | 06157551 | 6/1994 |
| WO | 02/04541 A2 | 1/2002 |
| WO | 02/04541 A3 | 1/2002 |
| WO | 03/036692 A2 | 5/2003 |
| WO | 03/044089 A1 | 5/2003 |
| WO | 03/044848 A1 | 5/2003 |
| WO | 03/101164 A1 | 12/2003 |

OTHER PUBLICATIONS

Machine translation of JP 06-157551, provided by the JPO website.*
"Development of Environmental Friendly Non-Anhydride No-Flow Underfills," Z. Zhang et al. IEEE Transactions of Components and Packaging Technologies, vol. 25, No. 1, Mar. 2002, pp. 140-147.
"Nanocomposite Underfills for Flip-Chip Applications," Kathleen Gross et al., IEEE Electronic Components and Technology Conference, 2003, pp. 951-956.
New Materials for High Performance No-Flow Underfill, Kathleen Gross et al., Proceedings of SPIE-The International Society for Optical Engineering, vol. 4931, pp. 234-238, 2002.
"Underfill Adhesive Films for Flip Chip and CSP Packages," David R. Gagnon et al., Proceedings of the Technical Program, Island of Hawaii, Feb. 18-20, 2003, pp. 281-286.
"Characterization of the Curing Properties of No-Flow Underfill and B-Stage Feasibility Study for Wafer Level Application," Z. Zhang et al., 2003 Electronic Components and Technology Conference, 2003, IEEE Catalog No. 03CH37438, pp. 971-977.
"Filled No-Flow Underfilling—Process and Materials," W. Yin et al., Proceeding-SPIE International Society for Optical Engineering, 2003, vol. 5288.
"Advanced Capillary Underfill For Flip Chip Attachment," S. Hackett et al., SMTA International Proceedings, 2002, pp. 389-396.
"No Flow-Fluxing Underfill Material and Process Considerations," D. Katze, Electronics Assembly Process Exhibition Conference, 2001.
PCT International Search Report dated Mar. 29, 2005.

* cited by examiner

*Primary Examiner*—Michael J. Feely

(57) ABSTRACT

An underfill composition with enhanced adhesion and improved resistance to cracking comprising an epoxy resin in combination with a difunctional siloxane anhydride epoxy hardener and optional reagents. In some embodiments, the epoxy resin includes a functionalized colloidal silica filler having a particle size ranging from about 1 nm to about 500 nm. The difunctional siloxane anhydride epoxy hardener can optionally be combined with liquid anhydride epoxy hardeners. Cure catalysts, hydroxyl-containing monomers, adhesion promoters, flame retardants and defoaming agents may also be added to the composition. Further embodiments of the present disclosure include packaged solid state devices comprising the underfill compositions.

31 Claims, No Drawings

US 7,279,223 B2

UNDERFILL COMPOSITION AND PACKAGED SOLID STATE DEVICE

BACKGROUND OF THE INVENTION

The present disclosure is related to underfill materials utilized in electronic devices. More particularly, the present disclosure is related to novel no-flow underfill compositions including an epoxy resin in combination with epoxy hardener, and optional reagents. The epoxy hardener can be a difunctional siloxane anhydride or a mixture of a difunctional siloxane anhydride with a liquid organic anhydride. The resulting underfill material has enhanced adhesion and improved physical properties.

Demand for smaller and more sophisticated electronic devices continues to drive the electronic industry towards improved integrated circuit packages that are capable of supporting higher input/output (I/O) density as well as possessing enhanced performance with smaller die areas. While flip chip technology has been utilized to respond to these demanding requirements, a weak point of the flip chip construction is the significant mechanical stress experienced by solder bumps during thermal cycling. This stress is due to the coefficient of thermal expansion (CTE) mismatch between silicon die and substrate that, in turn, causes mechanical and electrical failures of the electronic devices.

Currently, capillary underfill is used to fill gaps between the silicon chip and substrate and improves the fatigue life of solder bumps. Unfortunately, many encapsulant compounds utilized in such underfill materials suffer from the inability to fill small gaps (50-100 μm) between the chip and substrate due to high filler content and high viscosity of the encapsulant.

While a new process, no-flow underfill, has been developed to address these issues, the use of resins filled with conventional fillers in these processes remains problematic. In the case of the no-flow process, application of the underfill resin is performed before die placement, a process change that avoids the time delay associated with wicking of the material under the die. In some cases, there is poor adhesion of the underfill materials to the chip and substrate and cracking can occur during thermocycling. In no-flow underfill applications, it is also desirable to avoid entrapment of filler particles during solder joint formulation. Thus, there remains a need to find a material that has a high glass transition temperature, low coefficient of thermal expansion and ability to form reliable solder joints during a reflow process such that it can fill small gaps between chips and substrates.

BRIEF DESCRIPTION OF THE INVENTION

The present disclosure provides a composition useful as an underfill resin comprising at least one epoxy resin in combination with at least one difunctional siloxane anhydride and optional reagents. In some embodiments, a functionalized colloidal silica filler is included in the epoxy resin. In other embodiments the difunctional siloxane anhydride epoxy hardener is combined with a liquid anhydride epoxy hardener. The difunctional siloxane anhydride epoxy hardener enhances adhesion of the underfill material and provides enhanced resistance to cracking during thermocycling. The compositions of the present disclosure provide good solder ball fluxing, a large reduction in the coefficient of thermal expansion. Preferably, the composition of the present invention is used as a no-flow underfill resin.

The composition of the present disclosure may be used as an encapsulant in a packaged solid state device.

DETAILED DESCRIPTION OF THE INVENTION

The underfill composition of the present disclosure is an epoxy resin combined with a difunctional siloxane anhydride epoxy hardener and optional reagents. In some embodiments, a functionalized colloidal silica filler is included in the epoxy resin. It has been found that the use of a difunctional siloxane anhydride epoxy hardener in an epoxy resin, optionally with a functionalized colloidal silica filler and other optional reagents, provides a curable epoxy formulation with a low viscosity before cure and whose cured parts have a low coefficient of thermal expansion (CTE). The resulting composition also has enhanced adhesion and possesses enhanced resistance to cracking during thermocycling.

"Low coefficient of thermal expansion" as used herein refers to a cured total composition with a coefficient of thermal expansion lower than that of the base resin as measured in parts per million per degree centigrade (ppm/° C.). Typically, the coefficient of thermal expansion of the cured total composition is below about 50 ppm/° C. "Cured" as used herein refers to a total formulation with reactive groups wherein between about 50% and about 100% of the reactive groups have reacted. "Glass transition temperature" as referred to herein is the temperature as which an amorphous material changes from a hard to a plastic state. "Low viscosity of the total composition before cure" typically refers to a viscosity of the underfill material in a range between about 50 centipoise and about 100,000 centipoise and preferably, in a range between about 1000 centipoise and about 20,000 centipoise at 25° C. before the composition is cured.

Preferred epoxy resins for use in accordance with the present disclosure are aliphatic, cycloaliphatic, and aromatic epoxy resins. The epoxy resins may further include any organic system or inorganic system with an epoxy functionality. When resins, including aromatic, aliphatic and cycloaliphatic resins are described throughout the specification and claims, either the specifically-named resin or molecules having a moiety of the named resin are envisioned. Useful epoxy resins include those described in "Chemistry and Technology of the Epoxy Resins," B. Ellis (Ed.) Chapman Hall 1993, New York and "Epoxy Resins Chemistry and Technology," C. May and Y. Tanaka, Marcel Dekker, New York (1972). Epoxy resins are curable monomers and oligomers which can be blended with the filler dispersion. The epoxy resins may include an aromatic epoxy resin or an alicyclic epoxy resin having two or more epoxy groups in its molecule. The epoxy resins in the composition of the present disclosure preferably have two or more functionalities, and more preferably two to four functionalities. Useful epoxy resins also include those that could be produced by reaction of a hydroxyl, carboxyl or amine containing compound with epichlorohydrin, preferably in the presence of a basic catalyst, such as a metal hydroxide, for example sodium hydroxide. Also included are epoxy resins produced by reaction of a compound containing at least one and preferably two or more carbon-carbon double bonds with a peroxide, such as a peroxyacid.

Aliphatic epoxy resins useful in the present disclosure include compounds that contain at least one aliphatic group and at least one epoxy group. Examples of aliphatic epoxies include butadiene dioxide, dimethylpentane dioxide, diglycidyl ether, 1,4-butanedioldiglycidyl ether, diethylene glycol diglycidyl ether, and dipentene dioxide.

In some embodiments, where utilized, aliphatic epoxy monomers can be included in the resin composition in amounts ranging from about 1% to about 50% by weight of the total resin composition, with a range of from about 5% to about 25% by weight being preferred.

Cycloaliphatic epoxy resins useful in the present disclosure are well known to the art and, as described herein, are compounds that contain at least about one cycloaliphatic group and at least one oxirane group. More preferred cycloaliphatic epoxies are compounds that contain about one cycloaliphatic group and at least two oxirane rings per molecule. Specific examples include 3-cyclohexenylmethyl-3-cyclohexenylcarboxylate diepoxide, 2-(3,4-epoxy)cyclohexyl-5,5-spiro-(3,4-epoxy)cyclohexane-m-dioxane, 3,4-epoxycyclohexylalkyl-3,4-epoxycyclohexanecarboxylate, 3,4-epoxy-6-methylcyclohexylmethyl-3,4-epoxy-6-methylcyclohexanecarboxylate, vinyl cyclohexanedioxide, bis(3,4-epoxycyclohexylmethyl)adipate, bis(3,4-epoxy-6-methylcyclohexylmethyl)adipate, exo-exo bis(2,3-epoxycyclopentyl) ether, endo-exo bis(2,3-epoxycyclopentyl) ether, 2,2-bis(4-(2,3-epoxypropoxy)cyclohexyl)propane, 2,6-bis(2,3-epoxypropoxycyclohexyl-p-dioxane), 2,6-bis(2,3-epoxypropoxy)norbornene, the diglycidylether of linoleic acid dimer, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3-epoxypropoxy)phenyl-5,6-epoxyhexahydro-4,7-methanoindane, o-(2,3-epoxy)cyclopentylphenyl-2,3-epoxypropyl ether), 1,2-bis(5-(1,2-epoxy)-4,7-hexahydromethanoindanoxyl)ethane, cyclopentenylphenyl glycidyl ether, cyclohexanediol diglycidyl ether, and diglycidyl hexahydrophthalate. Typically, the cycloaliphatic epoxy resin is 3-cyclohexenylmethyl-3-cyclohexenylcarboxylate diepoxide.

In some embodiments, where utilized, cycloaliphatic epoxy monomers can be included in the resin composition in amounts ranging from about 1% to about 100% by weight of the total resin composition, with a range of from about 25% to about 75% by weight being preferred.

Aromatic epoxy resins may also be used in accordance with the present disclosure. Examples of aromatic epoxy resins useful in the present disclosure include bisphenol-A epoxy resins, bisphenol-F epoxy resins, phenol novolac epoxy resins, cresol-novolac epoxy resins, biphenol epoxy resins, biphenyl epoxy resins, 4,4'-biphenyl epoxy resins, polyfunctional epoxy resins, divinylbenzene dioxide, and 2-glycidylphenylglycidyl ether. When resins, including aromatic, aliphatic and cycloaliphatic resins are described throughout the specification and claims, either the specifically-named resin or molecules having a moiety of the named resin are envisioned.

In some embodiments, where utilized, aromatic epoxy monomers can be included in the resin composition in amounts ranging from about 1% to about 100% by weight of the total resin composition, with a range of from about 25% to about 75% by weight being preferred.

In one embodiment, it is preferable that the epoxy resin include an aromatic epoxy resin or an alicyclic epoxy resin having two or more epoxy groups in its molecule. The epoxy resins in the composition of the present disclosure preferably have two or more functionalities, and more preferably two to four functionalities. Addition of these materials will provide resin composition with higher glass transition temperatures (Tg).

Examples of preferred difunctional aromatic epoxy resins include bisphenol A epoxies, including those commercially available from Resolution Performance Product as RSL-1462, and bisphenol F epoxies, including those commercially available from Resolution Performance Product as RSL-1739. Example of suitable trifunctional aromatic epoxy resins include triglycidyl isocyanurate epoxy, VG3101L manufactured by Mitsui Chemical and the like, and examples of tetrafunctional aromatic epoxy resins include Araldite MTO163 manufactured by Ciba Geigy and the like.

Examples of preferred alicyclic epoxy resins include difunctional alicyclic epoxies such as Araldite CY179 (Ciba Geigy), UVR6105 (Dow Chemical) and ESPE-3150 (Daicel Chemical), trifunctional alicyclic epoxies such as Epolite GT300 (Daicel Chemical), and tetrafunctional alicyclic epoxies such as Epolite GT400 (Daicel Chemical).

Silicone-epoxy resins may also be used in the present disclosure. Such resins typically have the formula:

where the subscripts a, b, c, d, e, f and g are zero or a positive integer, subject to the limitation that the sum of the subscripts b, d and f is one or greater; where M has the formula:

M' has the formula:

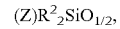

D has the formula:

D' has the formula:

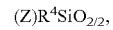

T has the formula:

T' has the formula:

and Q has the formula $SiO_{4/2}$, where each $R^1$, $R^2$, $R^3$, $R^4$, $R^5$ is independently at each occurrence a hydrogen atom, $C_{1-22}$ alkyl, $C_{1-22}$ alkoxy, $C_{2-22}$ alkenyl, $C_{6-14}$ aryl, $C_{6-22}$ alkyl-substituted aryl, and $C_{6-22}$ arylalkyl, which groups may be halogenated, for example, fluorinated to contain fluorocarbons such as $C_{1-22}$ fluoroalkyl, or may contain amino groups to form aminoalkyls, for example aminopropyl or aminoethylaminopropyl, or may contain polyether units of the formula $(CH_2CHR^6O)_k$ where $R^6$ is $CH_3$ or H and k is in a range between about 4 and 20; and Z, independently at each occurrence, represents a radical containing an epoxy group. The term "alkyl" as used in various embodiments of the present disclosure is intended to designate both normal alkyl, branched alkyl, aralkyl, and cycloalkyl radicals. Normal and branched alkyl radicals are preferably those containing in a range between about 1 and about 12 carbon atoms, and include as illustrative non-limiting examples methyl, ethyl, propyl, isopropyl, butyl, tertiary-butyl, pentyl, neopentyl, and hexyl. Cycloalkyl radicals represented are preferably those containing in a range between about 4 and about 12 ring carbon atoms. Some illustrative non-limiting examples of these cycloalkyl radicals include cyclobutyl, cyclopentyl, cyclohexyl, methylcyclohexyl, and cycloheptyl. Preferred aralkyl radicals are those containing in a range between about 7 and about 14 carbon atoms; these include, but are not limited to, benzyl, phenylbutyl, phenylpropyl, and phenylethyl. Aryl radicals used in the various embodiments of the present disclosure are preferably those containing in a range between about 6 and about 14 ring carbon atoms. Some illustrative non-limiting examples of these aryl radicals include phenyl, biphenyl, and naphthyl. An illustrative non-limiting example of a halogenated moiety suitable is 3,3,3-trifluoropropyl.

Combinations of the foregoing epoxy monomers and oligomers may also be used in the compositions of the present disclosure, e.g., a mixture of an alicyclic epoxy and an aromatic epoxy. The mixture of alicyclic and aromatic epoxy resins is preferable due to low viscosity and good cracking resistance. In one embodiment the epoxy resin can be a combination of 3-cyclohexenylmethyl-3-cyclohexenyl-carboxylate diepoxide (commercially available as UVR 6105 from Dow Chemical Co.), and bisphenol-F epoxy resin (commercially available as RSL-1739 from Resolution Performance Product). In another embodiment, a suitable epoxy resin includes a combination of 3-cyclohexenylmethyl-3-cyclohexenylcarboxylate diepoxide and bisphenol-A epoxy resin (commercially available as RSL-1462 from Resolution Performance Product). Where a bisphenol epoxy resin is utilized, the bisphenol resin preferably is present in the epoxy resin in an amount ranging from about 1% by weight to 100% by weight of the resin composition, with a range of from about 25% by weight to about 75% by weight being preferred.

Where a combination of epoxy monomers and oligomers is utilized, it is particularly favorable to use an epoxy mixture containing at least one epoxy resin having three or more functionalities such as triglycidyl isocyanurate, to thereby form an underfill resin having low CTE, good fluxing performance, and a high glass transition temperature (Tg). In some embodiments, the epoxy resin can thus include a trifunctional epoxy resin in addition to at least a difunctional alicyclic epoxy and a difunctional aromatic epoxy.

In order to form the curable epoxy formulation for use as an underfill material, a difunctional siloxane anhydride is utilized as an epoxy hardener. Such anhydrides and methods for their production are known to those skilled in the art and include, for example, the anhydrides disclosed in U.S. Pat. Nos. 4,542,226 and 4,381,396. Suitable anhydrides include those of the following formula:

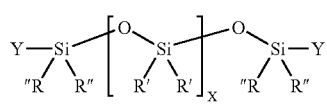
(1)

where X can be from 0 to 50 inclusive, preferably X can be from 0 to 10 inclusive, and most preferably X can be from 1 to 6 inclusive; where each R' and R" are independently at each occurrence $C_{1-22}$ alkyl, $C_{1-22}$ alkoxy, $C_{2-22}$ alkenyl, $C_{6-14}$ aryl, $C_{6-22}$ alkyl-substituted aryl, and $C_{6-22}$ arylalkyl; and where Y is represented by the following formula:

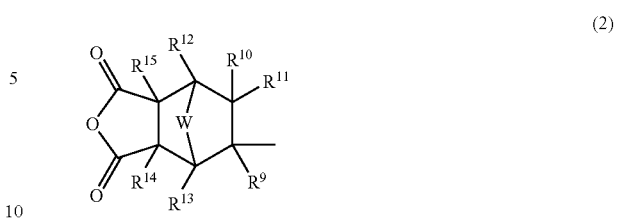
(2)

where $R^9$-$R^{15}$ are a members selected from hydrogen, halogen, $C_{(1-13)}$ monovalent hydrocarbon radicals and substituted $C_{(1-13)}$ monovalent hydrocarbon radicals, and W is selected from —O— and divalent hydrocarbon radical —$CR_2$—, wherein R has the same definition as $R^9$-$R^{15}$.

In some embodiments the R' and R" may be halogenated, for example fluorinated, to provide fluorocarbons such as $C_{1-22}$ fluoroalkyl. Preferably, R' and R" are methyl, ethyl, 3,3,3-trifluoropropyl or phenyl, most preferably R' and R" are both methyl.

The difunctional siloxane anhydride utilized in the present disclosure as an epoxy hardener can be a single compound or a mixture of oligomers with different lengths of siloxane chain which are terminated with the Y moiety. The difunctional siloxane anhydrides are included in the hardener component of the composition in amounts ranging from about 1% to about 100% by weight of the hardener component of the composition, preferably in a range of from about 10% to about 90% by weight, most preferably from about 10% to about 40% by weight.

Preferably, the dianhydrides of the present disclosure are of the following formula:

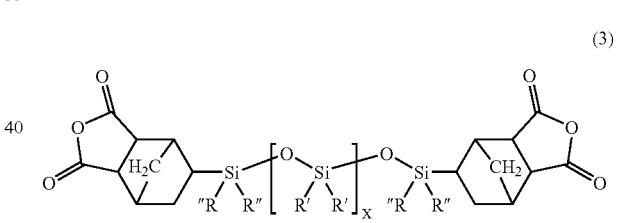
(3)

where X, R' and R" are as defined above in formula (1), i.e., X can be from 0 to 50 inclusive, preferably X can be from 0 to 10 inclusive, and most preferably X can be from 1 to 6 inclusive; and each R' and R" is independently at each occurrence $C_{1-22}$ alkyl, $C_{1-22}$ alkoxy, $C_{2-22}$ alkenyl, $C_{6-14}$ aryl, $C_{6-22}$ alkyl-substituted aryl, and $C_{6-22}$ arylalkyl. In some embodiments the R' and R" may be halogenated, for example fluorinated, to provide fluorocarbons such as $C_{1-22}$ fluoroalkyl. Preferably, R' and R" are methyl, ethyl, 3,3,3-Trifluoropropyl, or phenyl, most preferably methyl. As described above, a single compound can be used or a mixture of oligomers with different lengths of siloxane chain may be used.

Preferably, the difunctional siloxane anhydrides utilized as the epoxy hardener are produced by the hydrosilation reaction between 5-norbornene-2,3-dicarboxylic anhydride and silicon-hydride stopped siloxane oligomers of formula

H—SiR"$_2$—[O—SiR'$_2$]$_X$—O—SiR"$_2$—H    (4)

where X can be from 0 to 50 inclusive, preferably X can be from 0 to 10 inclusive, and most preferably X can be from 1 to 6 inclusive; and R', R"=methyl, ethyl, or phenyl, most preferably methyl. The hydrosilation process is performed in the presence of catalytic amounts of precious metals such as platinum, rhodium or iridium. The complex of $Pt^0$ with divinyltetramethyldisiloxane, referred to as Karstedt's catalyst and described in U.S. Pat. No. 3,775,442, is preferable. An example of the synthesis of these dianhydrides is set forth below in Scheme 1.

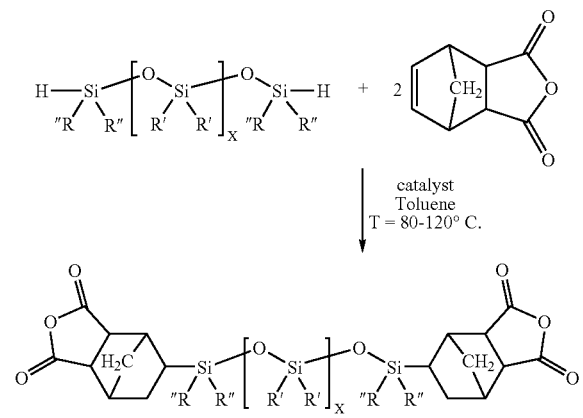

In one embodiment, the oligosiloxane dianhydride of the present disclosure is synthesized by hydrosilation of 1 mol 1,1,3,3,5,5-hexamethyltrisiloxane with two moles of 5-norbornene-2,3-dicarboxylic anhydride in the presence of Karstedt's platinum catalyst. In one embodiment, 5,5'-(1,1,3,3,5,5-hexamethyl-1,5,trisiloxanediyl)bis[hexahydro-4,7-methanoisobenzofuran-1,3-dione] can be used as the difunctional siloxane anhydride.

Optionally, the siloxane dianhydride may be combined with other known epoxy hardeners, including amine epoxy hardeners, phenolic resins, or carboxylic acid-anhydrides.

Exemplary amine epoxy hardeners typically include aromatic amines, aliphatic amines, or combinations thereof. Aromatic amines include, for example, m-phenylene diamine, 4,4'-methylenedianiline, diaminodiphenylsulfone, diaminodiphenyl ether, toluene diamine, dianisidene, and blends of amines. Aliphatic amines include, for example, ethyleneamines, cyclohexyldiamines, alkyl substituted diamines, menthane diamine, isophorone diamine, and hydrogenated versions of the aromatic diamines. Combinations of amine epoxy hardeners may also be used. Illustrative examples of amine epoxy hardeners are also described in "Chemistry and Technology of the Epoxy Resins" B. Ellis (Ed.) Chapman Hall, New York, 1993.

Exemplary phenolic resins typically include phenol-formaldehyde condensation products, commonly named novolac or cresol resins. These resins may be condensation products of different phenols with various molar ratios of formaldehyde. Illustrative examples of phenolic resin hardeners are also described in "Chemistry and Technology of the Epoxy Resins" B. Ellis (Ed.) Chapman Hall, New York, 1993. While these materials are representative of additives used to promote curing of the epoxy formulations, it will apparent to those skilled in the art that other materials such as but not limited to amino formaldehyde resins may be used as hardeners and thus fall within the scope of this invention.

Exemplary anhydride agents which may be included with the above dianhydride epoxy hardeners typically include methylhexahydrophthalic anhydride (MHHPA), methyltetrahydrophthalic anhydride, 1,2-cyclohexanedicarboxylic anhydride, bicyclo[2.2.1]hept-5-ene-2,3-dicarboxylic anhydride, methylbicyclo[2.2.1]hept-5-ene-2,3-dicarboxylic anhydride, phthalic anhydride, pyromellitic dianhydride, hexahydrophthalic anhydride, dodecenylsuccinic anhydride, dichloromaleic anhydride, chlorendic anhydride, tetrachlorophthalic anhydride, and the like, and mixtures thereof. Combinations comprising at least two anhydride curing agents may also be used. Illustrative examples are described in "Chemistry and Technology of the Epoxy Resins" B. Ellis (Ed.) Chapman Hall, New York, 1993 and in "Epoxy Resins Chemistry and Technology", edited by C. A. May, Marcel Dekker, New York, 2nd edition, 1988.

In some embodiments, the difunctional siloxane anhydride of the present disclosure is miscible with liquid carboxylic acid-anhydrides. The difunctional siloxane anhydride may be blended with a carboxylic acid-anhydride to form a liquid solution. In these embodiments, the epoxy hardener preferably includes a difunctional siloxane anhydride in combination with a liquid organic anhydride such as hexahydrophthalic anhydride, MHHPA, or tetrahydrophthalic anhydride, most preferably MHHPA.

Where utilized, the carboxylic acid-anhydrides are included in the hardener component of the composition in amounts ranging from about 1% to about 95% by weight of the hardener component of the composition, with a range of from about 10% to about 90% by weight being preferred and 60% to about 90% by weight being the most preferred.

Optionally, cure catalysts and/or an organic compound containing a hydroxyl moiety are included with the epoxy hardener.

Cure catalysts which can be added to form the epoxy formulation can be selected from typical epoxy curing catalysts that include, but are not limited to, amines, alkyl-substituted imidazole, imidazolium salts, phosphines, metal salts such as aluminum acetyl acetonate ($Al(acac)_3$), salts of nitrogen-containing compounds with acidic compounds, and combinations thereof. The nitrogen-containing compounds include, for example, amine compounds, di-aza compounds, tri-aza compounds, polyamine compounds and combinations thereof. The acid compounds include phenol, organo-substituted phenols, carboxylic acids, sulfonic acids and combinations thereof. A preferred catalyst is a salt of a nitrogen-containing compound. One such salt includes, for example, 1,8-diazabicyclo(5,4,0)-7-undecane. The salts of the nitrogen-containing compounds are commercially available, for example, as Polycat SA-1 and Polycat SA-102 from Air Products. Other preferred catalysts include triphenyl phosphine ($PPh_3$) and alkyl-imidazole.

Examples of organic compounds utilized as the hydroxyl-containing monomer include alcohols, alkane diols and triols, and phenols. Preferred hydroxyl-containing compounds include high boiling alkyl alcohols containing one or more hydroxyl groups and bisphenols. The alkyl alcohols may be straight chain, branched or cycloaliphatic and may contain from 2 to 24 carbon atoms. Examples of such alcohols include, but are not limited to, ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol, polyol-based polyoxyalkylenes, glycerol; and combinations of any of the foregoing. Further examples of alcohols include 3-ethyl-3-hydroxymethyl-oxetane, which is available as UVR6000 from Dow Chemicals and bisphenols.

Some illustrative, non-limiting examples of bisphenols include the dihydroxy-substituted aromatic hydrocarbons disclosed by genus or species in U.S. Pat. No. 4,217,438. Some preferred examples of dihydroxy-substituted aromatic compounds include 4,4'-(3,3,5-trimethylcyclohexylidene)-diphenol; 2,2-bis(4-hydroxyphenyl)propane (commonly known as bisphenol A); 2,2-bis(4-hydroxyphenyl)methane (commonly known as bisphenol F); 2,2-bis(4-hydroxy-3,5-dimethylphenyl)propane; 2,4-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)propane; bis(4-hydroxyphenyl)cyclohexylmethane; 2,2-bis(4-hydroxyphenyl)-1-phenylpropane; 2,2,2',2'-tetrahydro-3,3,3',3'-tetramethyl-1,1'-spirobi[1H-indene]-6,6'-diol (SBI); 2,2-bis(4-hydroxy-3-methylphenyl)propane (commonly known as DMBPC); resorcinol; and $C_{1-3}$ alkyl-substituted resorcinols.

Most typically, 2,2-bis(4-hydroxyphenyl)propane and 2,2-bis(4-hydroxyphenyl)methane are the preferred bisphenol compounds. Combinations of organic compounds containing hydroxyl moiety can also be used in the present disclosure.

Examples of suitable underfill materials in accordance with the present disclosure include combinations of 3-cyclohexenylmethyl-3-cyclohexenylcarboxylate diepoxide (commercially available as UVR 6105 from Dow Chemical Co.), bisphenol-F epoxy resin (including RSL-1739 which is commercially available from Resolution Performance Product), 5,5'-(1,1,3,3,5,5-hexamethyl-1,5,trisiloxanediyl)bis[hexahydro-4,7-methanoisobenzofuran-1,3-dione] (TriSDA), catalysts including salts of nitrogen-containing compounds such as Polycat SA-1 (from Air Products), and organic compounds having a hydroxyl-containing moiety such as 3-ethyl-3-hydroxy methyl oxetane, (commercially available as UVR 6000 from Dow Chemical Co.). In some embodiments, a bisphenol-A epoxy resin (such as RSL-1462 from Resolution Performance Product) may be used in place of the bisphenol-F resin. In other embodiments, a liquid carboxylic acid anhydride such as MHHPA can be included with TriSDA to form the epoxy hardener.

In some embodiments, the epoxy resin of the present disclosure preferably includes a dispersion of colloidal silica as a filler. Colloidal silica is a dispersion of submicron-sized silica ($SiO_2$) particles in an aqueous or other solvent medium. The colloidal silica contains up to about 85 weight % of silicon dioxide ($SiO_2$) and typically up to about 80 weight % of silicon dioxide. The particle size of the colloidal silica is typically in a range between about 1 nanometers (nm) and about 500 nm, preferably in a range from about 5 nm to about 250 nm, with a range of from about 20 nm to about 150 nm being most preferred. The colloidal silica is functionalized with an organoalkoxysilane to form an organofunctionalized colloidal silica.

Organoalkoxysilanes used to functionalize the colloidal silica are included within the formula:

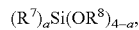

where $R^7$ is independently at each occurrence a $C_{1-18}$ monovalent hydrocarbon radical optionally further functionalized with alkyl acrylate, alkyl methacrylate, epoxide groups or $C_{6-14}$ aryl or alkyl radical, $R^8$ is independently at each occurrence a $C_{1-18}$ monovalent hydrocarbon radical or a hydrogen radical, and "a" is a whole number equal to 1 to 3 inclusive. Preferably, the organoalkoxysilanes included in the present disclosure are 2-(3,4-epoxy cyclohexyl)ethyltrimethoxysilane, 3-glycidoxypropyltrimethoxysilane, phenyltrimethoxysilane, and methacryloxypropyltrimethoxysilane. A combination of functionality is also possible.

Typically, the organoalkoxysilane is present in a range between about 1 weight % and about 60 weight % based on the weight of silicon dioxide contained in the colloidal silica with a range of from about 5 weight % to about 30 weight % being preferred.

The functionalization of colloidal silica may be performed by adding the organoalkoxysilane functionalization agent to a commercially available aqueous dispersion of colloidal silica in the weight ratio described above to which an aliphatic alcohol has been added. The resulting composition comprising the functionalized colloidal silica and the organoalkoxysilane functionalization agent in the aliphatic alcohol is defined herein as a pre-dispersion. The aliphatic alcohol may be selected from but not limited to isopropanol, t-butanol, 2-butanol, and combinations thereof. The amount of aliphatic alcohol is typically in a range between about 1 fold and about 10 fold of the amount of silicon dioxide present in the aqueous colloidal silica pre-dispersion.

The resulting organofunctionalized colloidal silica can be treated with an acid or base to adjust the pH. An acid or base as well as other catalysts promoting condensation of silanol and alkoxysilane groups may also be used to aid the functionalization process. Such catalysts include organo-titanate and organo-tin compounds such as tetrabutyl titanate, titanium isopropoxybis(acetylacetonate), dibutyltin dilaurate, or combinations thereof. In some cases, stabilizers such as 4-hydroxy-2,2,6,6-tetramethylpiperidinyloxy (i.e. 4-hydroxy TEMPO) may be added to this pre-dispersion. The resulting pre-dispersion is typically heated in a range between about 50° C. and about 100° C. for a period in a range between about 1 hour and about 12 hours.

The cooled transparent organic pre-dispersion is then further treated to form a final dispersion of the functionalized colloidal silica by addition of curable epoxy monomers or oligomers and optionally, more aliphatic solvent which may be selected from but not limited to isopropanol, 1-methoxy-2-propanol, 1-methoxy-2-propyl acetate, toluene, and combinations thereof. This final dispersion of the functionalized colloidal silica may be treated with acid or base or with ion exchange resins to remove acidic or basic impurities.

This final dispersion of the functionalized colloidal silica is then concentrated under a vacuum in a range between about 0.5 Torr and about 250 Torr and at a temperature in a range between about 20° C. and about 140° C. to substantially remove any low boiling components such as solvent, residual water, and combinations thereof to give a transparent dispersion of functionalized colloidal silica in a curable epoxy monomer, herein referred to as a final concentrated dispersion. Substantial removal of low boiling components is defined herein as removal of low boiling components to give a concentrated silica dispersion containing from about 15% to about 80% silica.

Where a functionalized colloidal silica filler is utilized, the resulting composition preferably contains functionalized silicon dioxide as the functionalized colloidal silica. In such a case, the amount of silicon dioxide in the final composition can range from about 15% to about 80% by weight of the final composition, more preferably from about 25% to about 75% by weight, and most preferably from about 30% to about 70% by weight of the final cured resin composition. The colloidal silica filler is essentially uniformly distributed throughout the disclosed composition, and this distribution remains stable at room temperature. As used herein "uniformly distributed" means the absence of any visible precipitate with such dispersions being transparent.

Where functionalized colloidal silica is utilized in the present disclosure, in some instances the pre-dispersion or the final dispersion of the functionalized colloidal silica may be further functionalized. Low boiling components are at least partially removed and subsequently, an appropriate capping agent that will react with residual hydroxyl functionality of the functionalized colloidal silica is added in an amount in a range between about 0.05 times and about 10 times the amount of silicon dioxide present in the pre-dispersion or final dispersion. Partial removal of low boiling components as used herein refers to removal of at least about 10% of the total amount of low boiling components, and preferably, at least about 50% of the total amount of low boiling components.

An effective amount of capping agent caps the functionalized colloidal silica and capped functionalized colloidal silica is defined herein as a functionalized colloidal silica in which at least 10%, preferably at least 20%, more preferably at least 35%, of the free hydroxyl groups present in the corresponding uncapped functionalized colloidal silica have been functionalized by reaction with a capping agent.

In some cases capping the functionalized colloidal silica effectively improves the cure of the total curable epoxy formulation by improving room temperature stability of the epoxy formulation. Formulations which include the capped functionalized colloidal silica show much better room temperature stability than analogous formulations in which the colloidal silica has not been capped.

Exemplary capping agents include hydroxyl reactive materials such as silylating agents. Examples of a silylating agent include, but are not limited to hexamethyldisilazane (HMDZ), tetramethyldisilazane, divinyltetramethyldisilazane, diphenyltetramethyldisilazane, N-(trimethylsilyl)diethylamine, 1-(trimethylsilyl)imidazole, trimethylchlorosilane, pentamethylchlorodisiloxane, pentamethyldisiloxane, and combinations thereof. The transparent dispersion is then heated in a range between about 20° C. and about 140° C. for a period of time in a range between about 0.5 hours and about 48 hours. The resultant mixture is then filtered. If the pre-dispersion was reacted with the capping agent, at least one curable epoxy monomer is added to form the final dispersion. The mixture of the functionalized colloidal silica in the curable monomer is concentrated at a pressure in a range between about 0.5 Torr and about 250 Torr to form the final concentrated dispersion. During this process, lower boiling components such as solvent, residual water, byproducts of the capping agent and hydroxyl groups, excess capping agent, and combinations thereof are substantially removed.

In another embodiment, the functionalized filler nanoparticles can be isolated from the dispersion by removal of solvent. The solvent removal process can be performed by applying heat and vacuum. Preferably, the solvent is removed by heating the dispersion to a temperature ranging from about 50° C. to about 150° C., at a pressure ranging from ambient to about 1 Torr, for a period of time ranging from about 1 hour to about 48 hours. The resulting free-flow powder can be subsequently washed with deionized water and dry. The dry nano-particles can be subsequently re-dispersed in the curable epoxy resin.

In another embodiment, the filler may include the functionalized colloidal silica described above blended with fused silica having particle sizes ranging from about 200 nm to 20 microns.

A reactive organic diluent may also be added to the total curable epoxy formulation to decrease the viscosity of the composition. Examples of reactive diluents include, but are not limited to, dodecylglycidyl ether, 4-vinyl-1-cyclohexane diepoxide, di(Beta-(3,4-epoxycyclohexyl)ethyl)-tetramethyldisiloxane, and combinations thereof. Reactive organic diluents may also include monofunctional epoxies and/or compounds containing at least one epoxy functionality. Representative examples of such diluents include, but are not limited to, alkyl derivatives of phenol glycidyl ethers such as 3-(2-nonylphenyloxy)-1,2-epoxypropane or 3-(4-nonylphenyloxy)-1,2-epoxypropane. Other diluents which may be used include glycidyl ethers of phenol itself and substituted phenols such as 2-methylphenol, 4-methyl phenol, 3-methylphenol, 2-butylphenol, 4-butylphenol, 3-octylphenol,4-octylphenol, 4-t-butylphenol, 4-phenylphenol and 4-(phenylisopropylidene)phenol.

Adhesion promoters can also be employed with the total curable epoxy formulation such as trialkoxyorganosilanes (e.g. γ-aminopropyltrimethoxysilane, 3-glycidoxypropyltrimethoxysilane, bis(trimethoxysilylpropyl)fumarate), and combinations thereof used in an effective amount which is typically in a range between about 0.01% by weight and about 2% by weight of the total curable epoxy formulation.

Flame retardants may optionally be used in the total curable epoxy formulation of the present disclosure in a range between about 0.5 weight % and about 20 weight % relative to the amount of the total curable epoxy formulation. Examples of flame retardants in the present disclosure include phosphoramides, triphenyl phosphate (TPP), resorcinol diphosphate (RDP), bisphenol-a-diphosphate (BPA-DP), organic phosphine oxides, halogenated epoxy resin (tetrabromobisphenol A), metal oxide, metal hydroxides, and combinations thereof.

Defoaming agents, dyes, pigments, and the like can also be incorporated into the total curable epoxy formulation.

The composition of the present disclosure may by hand mixed but also can be mixed by standard mixing equipment such as dough mixers, chain can mixers, planetary mixers, and the like. The blending of the components of the present disclosure can be performed in batch, continuous, or semi-continuous mode by any means known to those skilled in the art.

Curing typically occurs at a temperature in a range between about 100° C. and about 280° C., more typically in a range between about 180° C. and about 260° C. In addition, curing may typically occur over a period of time ranging from about 1 minute to about 3 hours, and more typically in a range between about 3 minutes and about 30 minutes. Optionally, the cured resins can be post-cured at a temperature in a range between about 100° C. and about 200° C., more typically in range between about 140° C. and about 180° C. over a period of time ranging from about 30 minutes to about 3 hours.

The incorporation of the difunctional siloxane anhydride as epoxy hardener in the epoxy resin to produce the underfill materials of the present disclosure results in underfill materials exhibiting improved adhesion to solder mask and aluminum as well as improved resistance to cracking during thermal-cycling. Moreover, in those cases where the epoxy resin includes a filler, the addition of the functionalized colloidal silica to an epoxy resin composition containing hydroxyl monomers and difunctional siloxane anhydride in accordance with the present disclosure has been unexpectedly found to provide good solder ball fluxing which, in combination with the large reduction in CTE, cannot be achieved with a conventional micron-sized fused silica. The resulting composition possesses both self-fluxing properties and the generation of acidic species during cure which leads to solder ball cleaning and good joint formation.

The underfill materials described in the present disclosure are dispensable and have utility in devices including, but not limited to, computers, semiconductors, or any device where underfill, overmold, or combinations thereof is needed. The underfill material can be used as an encapsulant to reinforce physical, mechanical, and electrical properties of solder bumps that typically connect a chip and a substrate.

While underfilling may be achieved by any method known in the art, preferably the underfill materials of the present disclosure are used as no-flow underfill. The process of no-flow underfilling generally includes first dispensing the underfill encapsulant material onto a substrate or semiconductor device, placing a flip chip on top of the encapsulant, and then performing the solder bump reflow operation to simultaneously form solder joints and cure the underfill encapsulant.

Preferably, the underfill composition of the present disclosure, which forms the encapsulant, is dispensed using a needle in a dot pattern in the center of a component footprint area. The amount of no-flow underfill is carefully controlled to achieve an ideal fillet size, while avoiding the phenomenon known as "chip-floating", which results from dispensing an excess of the no-flow underfill. The flip-chip die is placed on top of the dispensed no-flow underfill using an automatic pick and place machine. The placement force as well as the placement head dwell time are controlled to optimize cycle time and yield of the process.

The entire construction is then heated to melt solder balls, form solder interconnects and cure the underfill resin. The heating operation usually is performed on the conveyor in the reflow oven. The no-flow underfill can be cured by two significantly different reflow profiles. The first profile is referred to as the "plateau" profile, which includes a soak zone below the melting point of the solder. The second profile, referred to as the "volcano" profile, raises the temperature at a constant heating rate until the maximum temperature is reached. The maximum temperature during a cure cycle can range from about 200° C. to about 260° C. The maximum temperature during the reflow strongly depends on the solder composition and has to be about 10° C. to about 40° C. higher than the melting point of the solder balls. The heating cycle is between about 3 to about 10 minutes, and more typically is from about 4 to about 6 minutes. Optionally, the cured encapsulants can be post-cured at a temperature ranging from about 100° C. to about 180° C., more typically from about 140° C. to about 160° C. over a period of time ranging from about 1 hour to about 4 hours.

The underfill materials of the present disclosure permit the formation of solder joints before the underfill materials reach a gel point, yet the underfill materials are capable of forming a solid encapsulant at the end of the heat cycle. The underfill materials of the present disclosure have the ability to fill gaps in a range between about 10 microns and about 600 microns.

In accordance with one aspect of the present disclosure, a packaged solid state device is provided which includes a package, a chip, and an encapsulant comprising the underfill compositions of the present disclosure. In such a case, the encapsulant may be introduced to the chip by processes including capillary underfill, no-flow underfill, and the like, preferably by no-flow underfill. Chips which may be produced using the underfill composition of the present disclosure include semiconductor chips and LED chips.

In order that those skilled in the art will be better able to practice the present disclosure, the following examples are given by way of illustration and not by way of limitation.

EXAMPLE 1

Preparation of difunctional siloxane anhydride. A 500 milliliter (ml) flask equipped with mechanical stirrer, thermometer, condenser, addition funnel and nitrogen inlet was charged with 127 grams (0.77 mols) of 5-norbornene-2,3-dicarboxylic anhydride, 150 grams of toluene and 20 ppm of platinum as Karstedt's catalyst (i.e., a complex of $Pt^0$ with divinyltetramethyldisiloxane as described in U.S. Pat. No. 3,775,442). The solution was heated to 80° C. at which point 84.3 grams (0.4 mols) of 1,1,3,3,5,5-hexamethyltrisiloxane was added drop-wise to the reaction mixture. A mild exotherm took place and the temperature was raised to 100° C. The addition of silicone hydride was completed in 1 hour. The reaction mixture was stirred at 80° C. for one additional hour. Infrared (IR) analysis was conducted using an Avatar 370 FT-IR (from Thermo Electron Corporation); the results showed 75% conversion of Si—H groups. An additional 20 ppm of the platinum catalyst was added and the reaction mixture was heated to 80° C. with stirring under nitrogen over night. The next morning, IR analysis was again conducted; the results showed more than 99% consumption of Si—H. At that point the reaction mixture was cooled to room temperature.

The cooled reaction mixture was then mixed with 300 ml of hexane. A precipitation of white powder was observed. The solid material was separated by filtration and dried in vacuum oven at 50° C. to afford 180 grams of the desired difunctional siloxane anhydride. $^1H$, $^{29}Si$ NMR was conducted using a 400 MHz Bruker Avance NMR which confirmed both the structure and purity of the anhydride.

EXAMPLE 2

Preparation of functionalized colloidal silica pre-dispersions. A functionalized colloidal silica pre-dispersion (pre-dispersion 1) was prepared using the following procedure. 465 grams of aqueous colloidal silica (Nalco 1034A, Nalco Chemical Company) containing about 34 weight % of 20 nm particles of silica, was mixed with 800 grams of isopropanol (Aldrich) and 56.5 grams of phenyltrimethoxy silane (Aldrich) by stirring. The mixture was heated to 60-70° C. for 2 hours to give a clear suspension. The resulting pre-dispersion 1 was cooled to room temperature and stored in a glass bottle.

A pre-dispersion 2 of functionalized colloidal silica was prepared using the following procedure. 465 grams of aqueous colloidal silica (Nalco 1034A, Nalco Chemical Company) containing about 34 weight % of 20 nm particles of silica, was mixed with 800 grams of isopropanol and 4.0 grams of phenyltrimethoxy silane by stirring. The mixture was heated to 60-70° C. for 2 hours to give a clear suspension. The resulting pre-dispersion 2 was cooled to room temperature and stored in a glass bottle.

EXAMPLE 3

Preparation of resin 1 containing stabilized functionalized colloidal silica. A 1000 ml flask was charged with 300 grams of the colloidal silica pre-dispersion 1 from Example 2, 150 grams of 1-methoxy-2-propanol (Aldrich) as solvent and 0.5 grams of crosslinked polyvinylpyridine. The mixture was stirred at 70° C. After 1 hour the suspension was blended with 4 grams Celite® 545 (a commercially available diatomaceous earth filtering aid), cooled down to room temperature and filtered. The resulting dispersion of functionalized colloidal silica was blended with 40 grams of 3,4-epoxycyclohexylmethyl-3,4-epoxycyclohexane carboxylate (UVR6105 from Dow Chemical Company) and vacuum stripped at 75° C. at 1 Torr to constant weight to yield 87.9 grams of a viscous liquid resin (Resin 1).

EXAMPLE 4

Preparation of resin 2 containing stabilized functionalized colloidal silica. A 1000-milliliter (ml) flask was charged with 300 grams of the colloidal silica pre-dispersion 1 from Example 2, 150 grams of 1-methoxy-2-propanol (Aldrich) as solvent and 0.5 grams of crosslinked polyvinylpyridine. The mixture was stirred at 70° C. After 1 hour the suspension was blended with 4 grams Celite® 545 (a commercially available diatomaceous earth filtering aid), cooled down to room temperature and filtered. The resulting dispersion of functionalized colloidal silica was blended with 30 grams of 3,4-epoxycyclohexylmethyl-3,4-epoxycyclohexane carboxylate (UVR6105 from Dow Chemical Company) and 10 grams of bisphenol-F epoxy resins (RSL-1739 from Resolution Performance Product) and vacuum stripped at 75° C. at 1 Torr to constant weight to yield 88.7 grams of a viscous liquid resin (Resin 2).

EXAMPLE 5

Preparation of resin 3 containing stabilized functionalized colloidal silica. A 1000-milliliter (ml) flask was charged with 300 grams of the colloidal silica pre-dispersion 1 from Example 2, 150 grams of 1-methoxy-2-propanol (Aldrich) as solvent and 0.5 grams of crosslinked polyvinylpyridine. The mixture was stirred at 70° C. After 1 hour the suspension was blended with 4 grams Celite® 545 (a commercially available diatomaceous earth filtering aid), cooled down to room temperature and filtered. The resulting dispersion of functionalized colloidal silica was blended with 30 grams of 3,4-epoxycyclohexylmethyl-3,4-epoxycyclohexane carboxylate (UVR6105 from Dow Chemical Company) and 10 grams of Epon824 epoxy resins (from Resolution Performance Product) and vacuum stripped at 75° C. at 1 Torr to constant weight to yield 88.0 grams of a viscous liquid resin (Resin 3).

EXAMPLE 6

Preparation of resin 4 containing capped functionalized colloidal silica. A round bottom flask was charged with 100 grams of the colloidal silica pre-dispersion 2 from Example 2 and 100 grams of 1-methoxy-2-propanol. 100 grams of the total mixture was distilled off at 60° C. at mild vacuum of 50 Torr. 2 grams of hexamethyldisilazane (HMDZ) was added drop-wise to the concentrated dispersion of functionalized colloidal silica. The mixture was stirred at reflux for 1 hour. After 1 hour, the mixture was cooled to room temperature, Celite® 545 was added to the flask, and filtered. The clear dispersion of functionalized colloidal silica was blended with 10.5 grams of UVR6105 (from Dow Chemical Company) and 3.5 grams of RSL-1739 (from Resolution Performance Product) and vacuum stripped at 75° C. at 1 Torr to a constant weight to yield 28 grams of viscous liquid resin (Resin 4).

EXAMPLE 7

Preparation of curable epoxy formulations. The functionalized colloidal silica resins of Examples 3, 4, 5 and 6 were blended separately at room temperature with desired amount of 4-methyl-hexahydrophthalic anhydride (MHHPA) (from Aldrich) and 5,5'-(1,1,3,3,5,5-hexamethyl-1,5,trisiloxanediyl)bis[hexahydro-4,7-methanoisobenzofuran-1,3-dione] (TriSDA) (the difunctional siloxane anhydride product of Example 1). (Details regarding these formulations are set forth in the Tables below.) Desired amounts of catalyst (Polycat SA-1 from Air Products) and optional additives as set forth in the Tables below were added at room temperature. The formulations were blended at room temperature for approximately 10 minutes after which time the formulation was degassed at high vacuum at room temperature for 20 minutes. The resulting materials were stored at −40° C.

Glass transition temperature (Tg) was determined by non-isothermal Differential Scanning Calorimeter (DSC) experiments performed with TA Instruments Q100 system. Approximately 10 mg samples of the underfill material were sealed in aluminum hermetic pans. The samples were heated from room temperature to 300° C. at a rate of increase of 30° C./minute. The heat flow during curing was recorded. Tg was determined based on the second heating cycle of the same sample.

CTE of the cured underfill materials was determined with a TMA7 Thermal Mechanical Analyzer from Perkin Elmer following the manufacturer's directions. The sample was heated in the TMA furnace from 0° C. to 260° C. at a rate of 10° C./min under nitrogen atmosphere. CTE was determined in a temperature range from 20° C. to 100° C. The onset temperature of the change in the rate of thermal expansion was used to determine glass transition temperature.

Adhesion was determined by the following procedure. A drop (~0.07 grams) of the degassed no-flow underfill material was dispensed on a FR4 board coated with solder mask (Taiyo/PSR 4000). A glass chip was placed on the top of the drop. The resulting sample was cured in an oven using following procedure: the temperature was ramped up from 30° C. to 220° C. at a rate of 30° C./minute, held for 5 minutes at 220° C., cooled to 160° C., held at 160° C. for 60 minutes, and then cooled to 30° C. Adhesion was determined using a die shear tester (from IMADA, Inc.).

The Flip-chip assembly was performed using the following procedure. Standard FR-4 and high Tg/low CTE FR-4 boards were used for assembly having electrolytic nickel with a gold flash layer surface finish (procured from TopLine (Garden Grove, Calif.)). The bond pads on both test boards were defined by a rectangular trench etched out of the solder mask (Taiyo/PSR 4000). A controlled amount of no-flow underfill material was dispensed using a 22-gauge needle in a dot pattern in the center of the component footprint area to test boards previously baked at 125° C. for 2 hours. Flip chip die were placed using an MRSI 505 automatic pick and place machine (Newport/MSRI Corp.) with a placement force of 150 grams and placement head dwell time of 500 milliseconds. Reflow of these test vehicles was carried out using a Zepher convection reflow oven (MannCorp) using a standard eutectic tin/lead profile with a soak zone. A post cure step of 1 hour at 160° C. after reflow was necessary to complete the curing step. The assembled flip-chips were subjected to Air-to-Air Thermal Shock (AATS) (−55° C. to +125° C.) for 1000 cycles (dwell time: 10 minutes at each extreme) in a thermal shock chamber from RANSCO Industries (Oxnard, Calif.). The samples were monitored for cracking and electrical continuity through thermal shock testing by probing with a digital multimeter from Fluke Corporation (Everett, Wash.) and by visual inspection under magnification, respectively.

Table 1 below illustrates the effects of the addition of difunctional siloxane anhydride (TriSDA) on the adhesion and crack resistance of no-flow underfill compositions based on resins 2 and 3.

TABLE 1

| Components | 1A | 1B | 1C | 1D |
|---|---|---|---|---|
| Resin 2/g | 5 | | 5 | |
| Resin 3/g | | 5 | | 5 |
| MHHPA/g | 2 | 2 | 1.56 | 1.53 |
| TriSDA/g | | | 1.56 | 1.53 |
| Polycat SA-1/g | 0.01 | 0.01 | 0.01 | 0.01 |
| GLYMO/g | 0.07 | 0.07 | 0.07 | 0.07 |
| Adhesion to solder mask/ Pounds to break | 17 | 18 | >50 no break | >50 no break |
| Cracking during AATS | 5 cycles | 5 cycles | >500 cycles | >500 cycles |
| Tg (DSC)/° C. | 157 | 142 | 143 | 140 |
| CTE (TMA) ppm/° C. | 49 | 47 | 57 | 56 |

GLYMO - γ-glycidoxypropyltrimethoxysilane from GE Silicones.

As can be seen in Table 1, formulations with TriSDA had excellent adhesion and good resistance to cracking during the AATS test.

Table 2 below illustrates the effect of different levels of TriSDA on the observed adhesion to solder mask for an underfill composition based on resin 1.

TABLE 2

| Components | 2A | 2B | 2C | 2D | 2E |
|---|---|---|---|---|---|
| Resin 1/g | 5 | 5 | 5 | 5 | 5 |
| MHHPA/g | 2.33 | 2.28 | 2.22 | 2.09 | 1.73 |
| TriSDA/g | 0 | 0.12 | 0.25 | 0.52 | 1.16 |
| Polycat SA-1/g | 0.014 | 0.015 | 0.015 | 0.015 | 0.016 |
| AEAPTMS/g | 0.05 | 0.05 | 0.05 | 0.05 | 0.05 |
| Adhesion to solder mask/Pounds to break | 21 | 30.6 | 33 | >50 no break | >50 no break |
| Tg (DSC)/° C. | 177 | 183 | 170 | 159 | 163 |
| CTE (TMA) ppm/° C. | 41 | 43 | 43 | 47 | 50 |

AEAPTMS - Aminoethylaminopropyltrimethoxysilane from GE Silicones.

The formulations containing even small amounts of TriSDA showed improved adhesion compared with the formulation lacking TriSDA.

Table 3 below illustrates the effect of different levels of TriSDA on the observed adhesion to solder mask of the no-flow underfill composition based on resin

TABLE 3

| Components | 3A | 3B | 3C | 3D | 3E |
|---|---|---|---|---|---|
| Resin 4/g | 5 | 5 | 5 | 5 | 5 |
| MHHPA/g | 2.52 | 2.46 | 2.40 | 2.26 | 1.87 |
| TriSDA/g | 0 | 0.13 | 0.27 | 0.56 | 1.25 |
| Polycat SA-1/g | 0.009 | 0.009 | 0.009 | 0.009 | 0.009 |
| UVR6000/g | 0.17 | 0.17 | 0.17 | 0.17 | 0.17 |
| Adhesion to Solder Mask/PSI | 4262 | 3690 | 4397 | 6244 | 6050 |
| Adhesion to Aluminum/ Pounds to break | 3 | 14 | 14 | 17 | 27 |
| Tg (DSC)/° C. | 166 | 160 | 166 | 161 | 156 |
| CTE (TMA) ppm/° C. | 49 | 49 | 50 | 54 | 56 |

UVR 6000 is 3-ethyl-3-hydroxy methyl oxetane, an oxetane diluent commercially available from Dow Chemical Company As can be seen from the above, formulations containing difunctional siloxane anhydride had improved adhesion.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

The invention claimed is:

1. An underfil composition comprising;
   at least one epoxy resin in combination with at least one epoxy hardener, the at least one epoxy hardener comprising at least one difunctional siloxane anhydride, and
   further comprising a colloidal silica filler functionalized with an organoalkoxysilane and having a particle size in a range of from about 1 nanometer to about 500 nanometers, and wherein the colloidal silica is end-capped by a silylating agent.

2. The underfill composition in accordance with claim 1, wherein the at least one difunctional siloxane anhydride has the formula:

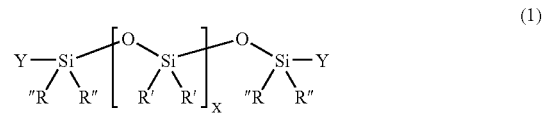

(1)

where X is from 0 to 50 inclusive, each R' and R" are independently selected from the group consisting of $C_{1-22}$ alkyl, $C_{1-22}$ alkoxy, $C_{2-22}$ alkenyl, $C_{6-14}$ aryl, $C_{6-22}$ alkyl-substituted aryl, and $C_{6-22}$ arylalkyl, and where Y is represented by the following formula:

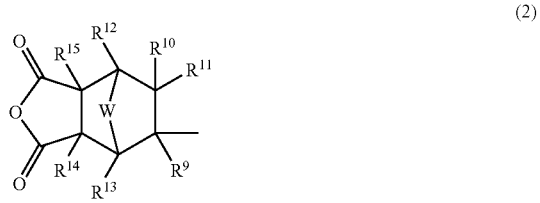

(2)

where $R^9$-$R^{15}$ are each independently selected from the group consisting of hydrogen, halogen, $C_{(1-13)}$ monovalent hydrocarbon radicals and substituted $C_{(1-13)}$ monovalent hydrocarbon radicals, and W is selected from the group consisting of —O— and —CR$_2$—, wherein R is selected from the group consisting of hydrogen, halogen, $C_{(1-13)}$ monovalent hydrocarbon radicals and substituted $C_{(1-13)}$ monovalent hydrocarbon radicals.

3. The underfill composition of claim 2, wherein X in formula (1) is from 0 to 10 inclusive.

4. The underfill composition of claim 2, wherein X in formula (1) is from 1 to 6 inclusive.

5. The underfill composition of claim 2, wherein R' and R" in formula (1) are selected from the group consisting of $C_{1-22}$ fluoroalkyl, methyl, ethyl, and phenyl.

6. The underfill composition of claim 2, wherein the at least one difunctional siloxane anhydride comprises a mixture of oligomers of formula (1), and wherein X in formula (1) is from 0 to 10 inclusive.

7. The underfill composition in accordance with claim 1, wherein the at least one difunctional siloxane anhydride has the formula:

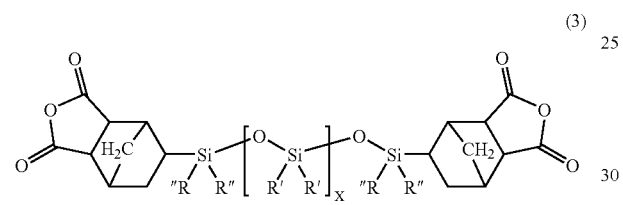

(3)

where X is from 0 to 50 inclusive, and each R' and R" are independently selected from the group consisting of $C_{1-22}$ alkyl, $C_{1-22}$ alkoxy, $C_{2-22}$ alkenyl, $C_{6-14}$ aryl, $C_{6-22}$ alkyl-substituted aryl, and $C_{6-22}$ arylalkyl.

8. The underfill composition of claim 7, wherein X in formula (3) is from 0 to 10 inclusive.

9. The underfill composition of claim 7, wherein X in formula (3) is from 1 to 6 inclusive.

10. The underfill composition of claim 7, wherein R' and R" in formula (3) are selected from the group consisting of $C_{1-22}$ fluoroalkyl, methyl, ethyl, and phenyl.

11. The underfill composition of claim 7, wherein the at least one difunctional siloxane anhydride comprises a mixture of oligomers of formula (3) and wherein X in formula (3) is from 0 to 10 inclusive.

12. The underfill composition of claim 1, further comprising at least one anhydride epoxy hardener selected from the group consisting of methylhexahydrophthalic anhydride, methyltetrahydrophthalic anhydride, 1,2-cyclohexartedicarboxylic arthydride, bicyclo(2.2.1)hept-5-ene-2,3-dicarboxylic anhydride, methylbicyclo(2.2.1)hept-5-ene-2,3-dicarboxylic arthydride, phthalic anhydride, pyromellitic dianhydride, hexahydrophthalic anhydride, dodecenylsuccinic anhydride, dichioromaleic anhydride, chlorendic anhydride, tetrachlorophthalic anhydride, and mixtures thereof.

13. The underfill composition of claim 1, further comprising a liquid epoxy hardener selected from the group consisting of methylhexahydrophthalic anhydride, hexahydrophthalic anhydride, and tetrahydrophthalic anhydride.

14. The underfill composition of claim 1, wherein the colloidal silica filler is functionalized with phenyltrimethoxysilane.

15. The underfill composition of claim 1, wherein the silylating agent is hexamethyldisilazane.

16. The underfill composition in accordance with claim 1, wherein the epoxy resin comprises a cycloaliphatic epoxy monomer, an aliphatic epoxy monomer, an aromatic epoxy monomer, a silicone epoxy monomer, or combinations thereof.

17. The underfill composition in accordance with claim 1, further comprising a cure catalyst selected from the group consisting of amines, phosphines, metal salts, salts of nitrogen-containing compounds, and combinations thereof.

18. The underfill composition in accordance with claim 1, further comprising a hydroxyl-containing monomer selected from the group consisting of alcohols, alkane diols, glycerol, and phenols.

19. An underfill composition comprising at least one epoxy resin in combination with a colloidal silica filler functionalized with an organoalkoxysilane and having a particle size ranging from about 1 nanometer to about 500 nanometer, and at least one epoxy hardener, wherein the at least one epoxy hardener comprises a difunctional siloxane anhydride of the formula:

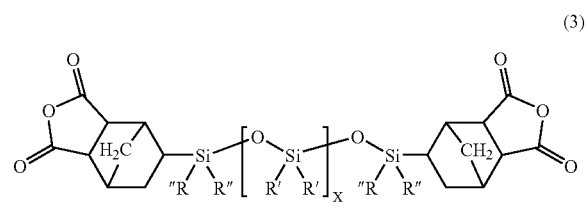

(3)

where X is from 0 to 50 inclusive, and each R' and R" are independently selected from the group consisting of $C_{1-22}$ alkyl, $C_{1-22}$ alkoxy, $C_{2-22}$ alkenyl, $C_{6-14}$ aryl, $C_{6-22}$ alkyl-substituted aryl, and $C_{6-22}$ arylalkyl, and wherein the colloidal silica filler is functionalized with phenyltrimethoxysilane and wherein the colloidal silica is endcapped by a silylating agent.

20. The underfill composition of claim 19, wherein the silylating agent is hexamethyldisilazane.

21. A packaged solid state device comprising:
a package;
a chip; and
an encapsulant comprising at least one epoxy resin in combination with a colloidal silica filler functionalized with an organoalkoxysilane and having a particle size ranging from about 1 nanometer to about 500 nanometer, and at least one epoxy hardener, wherein the at least one epoxy hardener comprises a difunctional siloxane anhydride of the formula:

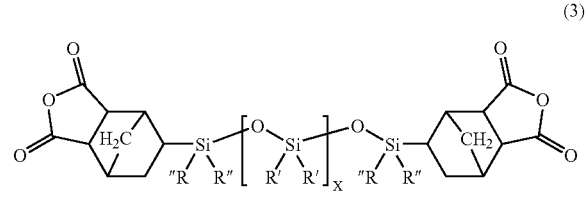

(3)

where X is from 0 to 50 inclusive, and each R' and R" are independently selected from the group consisting of $C_{1-22}$ alkyl, $C_{1-22}$ alkoxy, $C_{2-22}$ alkenyl, $C_{6-14}$ aryl, $C_{6-22}$ alkyl-substituted aryl, and $C_{6-22}$ arylalkyl, and
wherein the colloidal silica is endcapped by a silylating agent.

22. The packaged solid state device of claim 21, wherein X in formula (3) is from 0 to 10 inclusive.

23. The packaged solid state device of claim 21, wherein X in formula (3) is from 1 to 6 inclusive.

24. The packaged solid state device of claim 21, wherein R' and R" in formula (3) are independently selected from the group consisting of $C_{1-22}$ fluoroalkyl, methyl, ethyl, and phenyl.

25. The packaged solid state device of claim 21, wherein the at least one difunctional siloxane anhydride in the encapsulant comprises a mixture of oligomers of formula (3) and wherein X in formula (3) is from 0 to 10 inclusive.

26. The packaged solid state device of claim 21, wherein the encapsulant further comprises at least one anhydride epoxy hardener selected from the group consisting of methylhexahydrophthalic anhydride, methyltetrahydrophthalic anhydride, 1,2-cyclohexanedicarboxylic anhydride, bicyclo(2.2.1)hept-5-ene-2,3-dicarboxylic anhydride, methylbicyclo(2.2.1)hept-5-ene-2,3-dicarboxylic anhydride, phthalic anhydride, pyromellitic diarthydride, hexahydrophthalic anhydride, dodecenylsuccinic anhydride, dichloromaleic anhydride, chlorendic anhydride, tetrachlorophthalic anhydride, and mixtures thereof.

27. The packaged solid state device of claim 21, wherein the encapsulant further comprises a liquid epoxy hardener selected from the group consisting of methylhexahydrophthalic anhydride, hexahydrophthalic anhydride, and tetrahydrophthalic anhydride.

28. The packaged solid state device of claim 21, wherein the colloidal silica filler in the encapsulant is functionalized with phenyltrimethoxysilane.

29. The packaged solid state device of claim 21, wherein the silylating agent is hexamethyldisilazane.

30. The packaged solid state device of claim 21, wherein the epoxy resin in the encapsulant comprises a cycloaliphatic epoxy monomer, an aliphatic epoxy monomer, an aromatic epoxy monomer, a silicone epoxy monomer, or combinations thereof.

31. The packaged solid state device of claim 21, wherein the encapsulant further comprises a cure catalyst selected from the group consisting of amines, phosphines, metal salts, salts of nitrogen-containing compounds, and combinations thereof.

* * * * *